(12) United States Patent
Verkleeren et al.

(10) Patent No.: US 7,554,460 B2
(45) Date of Patent: Jun. 30, 2009

(54) UTILITY METER ANTENNA FOR GROUND MOUNTED METER BOXES

(76) Inventors: Jeff Verkleeren, 928 Conway Ave., Belle Vernon, PA (US) 15012; John Zayak, Box 198, La Belle, PA (US) 15450; Cristian Paun, 904 Aster La., Lompoc, CA (US) 93436; Mike Zimmerman, 173 Varsity Rd., Masontown, PA (US) 15461

( * ) Notice: Subject to any disclaimer, the term of this patent is extended or adjusted under 35 U.S.C. 154(b) by 456 days.

(21) Appl. No.: 11/534,707

(22) Filed: Sep. 25, 2006

(65) Prior Publication Data

US 2008/0074283 A1    Mar. 27, 2008

(51) Int. Cl.
G08B 23/00    (2006.01)
(52) U.S. Cl. .................. 340/870.02; 343/719; 343/769
(58) Field of Classification Search ................................
340/870.02–870.03, 539.26; 343/769, 719, 343/715
See application file for complete search history.

(56) References Cited

U.S. PATENT DOCUMENTS

| 5,298,894 | A | 3/1994 | Cerny et al. |
|---|---|---|---|
| 5,617,084 | A | 4/1997 | Sears |
| 5,659,300 | A | 8/1997 | Dresselhuys et al. |
| 5,825,303 | A | 10/1998 | Bloss, Jr. et al. |
| 5,877,703 | A | 3/1999 | Bloss, Jr. et al. |
| 6,177,883 | B1 | 1/2001 | Jennetti et al. |
| 6,218,995 | B1 | 4/2001 | Higgins et al. |
| 6,288,685 | B1 | 9/2001 | Thomas |
| 6,304,227 | B1 | 10/2001 | Hill et al. |
| 6,414,605 | B1 | 7/2002 | Walden et al. |
| 6,606,065 | B1 | 8/2003 | Payne et al. |
| 6,617,976 | B2 | 9/2003 | Walden et al. |
| 6,954,144 | B1 | 10/2005 | Kiser et al. |

OTHER PUBLICATIONS

International Search Report and Written Opinion, Jan. 3, 2008.

*Primary Examiner*—Albert K Wong
(74) *Attorney, Agent, or Firm*—Andrus, Sceales, Starke & Sawall, LLP

(57) ABSTRACT

A method and apparatus for transmitting utility meter data from an underground meter pit. The device includes a radiating antenna that is positioned entirely above the top surface of the pit lid. The radiating antenna conductively contacts a portion of the transmitter supported on the pit lid by the antenna housing. The transmitter housing includes an isolation sleeve that physically contacts a portion of the radiating antenna to enhance the signal transfer from the transmitter to the radiating antenna.

27 Claims, 5 Drawing Sheets

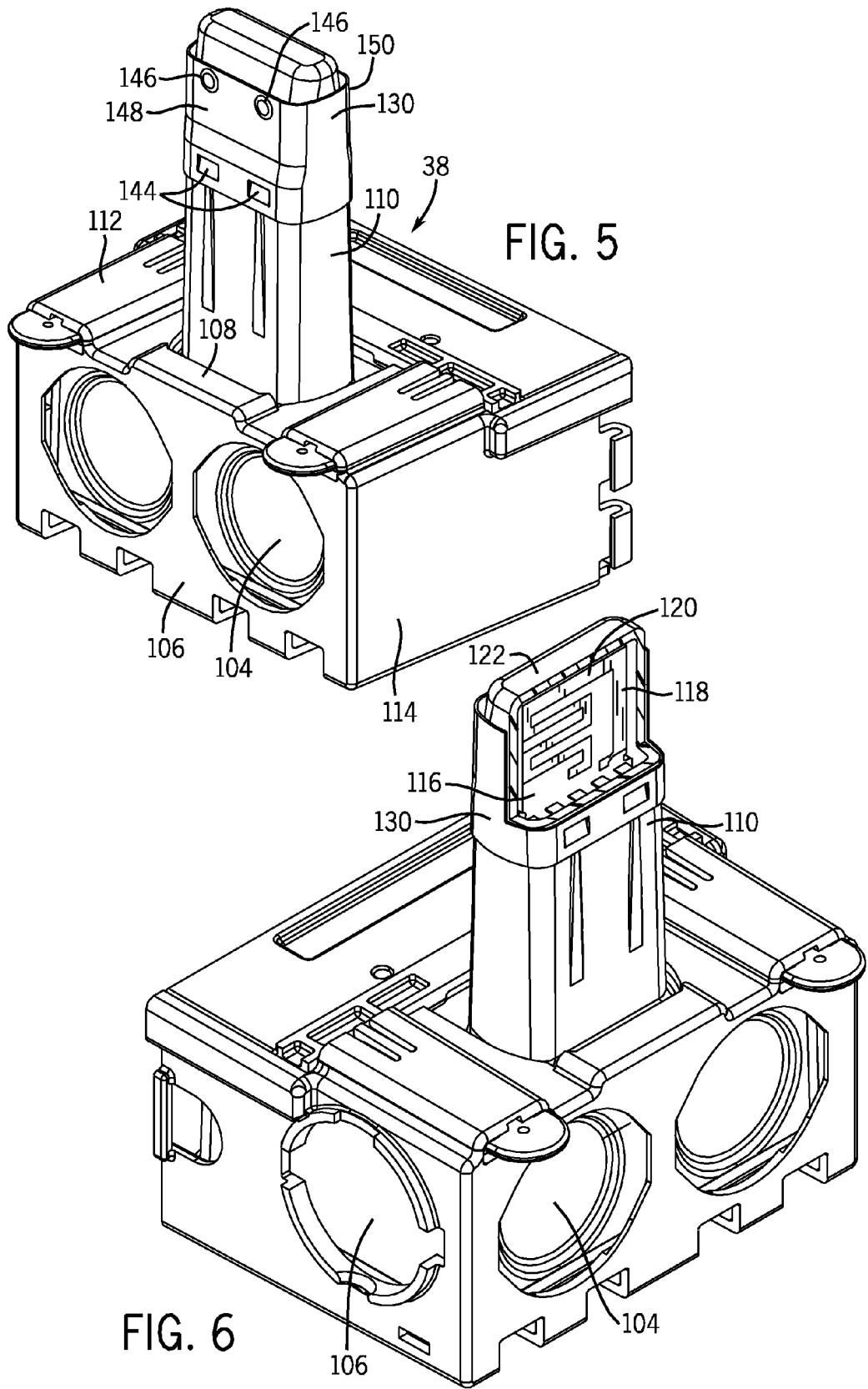

UTILITY METER ANTENNA FOR GROUND MOUNTED METER BOXES

BACKGROUND OF THE INVENTION

The present invention generally relates to the automatic reading of utility meters. More specifically, the present invention is related to a method and apparatus for transmitting utility meter data from an underground meter pit using a removable pit lid and antenna.

A longstanding problem in the utility industry is the economic reading of utility meters without inconvenience to the homeowner. The problem is especially acute in connection with the reading of water meters. In geographic areas that are subject to freezing temperatures, it has in the past been necessary to install meters within the residence to prevent damage to the meter when the temperature drops such that the water within the meter freezes. However, the reading of such meter installations presents a number of problems, such as the inconvenience to the homeowner as well as the inconvenience to the meter reader when the homeowner is not present at the time of the individual meter reading.

In addition, manual meter reading has a significant disadvantage in that it requires a large amount of manpower, leading to significant expense. Further, meter readers may erroneously record the numeral values of the meter register or the homeowner may not be present at the time the meter reading is to take place.

In order to solve the personnel requirements of physical meter reading, a large number of remote meter reading units have been developed. These meter reading units may be, for example, an automatic meter reading (AMR) unit. The meter register comprises a sensor to detect the rotation of movement of the components within the meter to generate an electrical count of the volume of commodity that flows through the meter. The recorded data from the meter is broadcast by a communication device of the AMR unit using an RF signal. In such types of systems, the meter measurement is broadcast from the communication device using an RF signal that can be read from a remote location. In these remote meter reading systems, the antenna of the communication device typically extends slightly above the pit lid such that the radio frequency signals generated by the antenna can be transmitted away from the meter pit. In many situations, the pit lid is formed from a metallic material, such as iron, that significantly inhibits the transmission of radio frequency signals therethrough.

In current AMR applications being developed, a radio transmission circuit including an antenna is used to transmit meter-related information over a relatively long distance, such as up to one-half mile. The use of an AMR radio to transmit metered-related information over a relatively long distance allows the meter data to be read from a remote location and eliminates the requirements of a meter reader physically interrogating the meter from a location approximate to the meter.

As the use of fixed network AMR systems for commercial, residential and remote applications increases, the need for a robust antenna assembly has become increasingly important. Since many meter pit locations were established as the original water infrastructure was constructed, improvements to the roadways and sidewalks, as well as a reduction in costs, has forced the need for safe, low profile and rugged metering products. Currently, AMR antennas are being used on sidewalks where pedestrian traffic may interact with the antenna assembly and in areas of heavy vehicular traffic. Thus, antenna designs must achieve a balance between physical size, RF performance and mechanical strength to make the products ideally suited for long-range communication, supporting vehicle traffic and pedestrian safety.

When such arrangements are in use, material close to the antenna may affect the efficiency of the antenna in radiating the desired signals. The use of pit-mounted antenna arrangements are often complicated by the type of material used to form the pit lid and the operating environment in the area surrounding the antenna. As an example, pit lids can be formed from a variety of materials, such as cast iron, plastic or concrete, which dramatically affects the radiating pattern of pit lid antennas that include radiating elements either positioned below or have a portion of the antenna extending past the top edge of the pit lid.

In addition to the problems associated with the radiation pattern of the pit lid antenna, it is also desirable to provide a pit lid antenna that can be easily mounted to the pit lid and removed as desired. Further, it is desired to provide a pit lid antenna that includes dependable signal contacts to ensure adequate transmission of meter data.

SUMMARY OF THE INVENTION

The present invention is a communication device for transmitting utility meter data from an underground meter pit having a pit lid that encloses an underground utility meter. The communication device receives usage information from the utility meter and transmits the information to a remote collection station or device using RF signals.

The communication device includes a self-contained transmitter and a self-contained antenna unit that can be mated in the field and supported entirely by the pit lid. The transmitter includes a transmitter housing that encloses a transmission circuit. The transmission circuit includes the required electronic circuitry to receive commodity usage information from the utility meter and convert the usage data into RF signals for transmission from the communication device. Preferably, the transmitter circuitry receives the usage information from the utility meter by an inductive connection to the utility meter.

The transmitter includes a transmitter post that extends upward from the transmitter housing. The transmitter post encloses a circuit board including a transmission element. The transmission element is used to transmit the usage information from a transmitter circuitry to a radiating antenna that forms part of the communication device. Preferably, the transmission element is a printed trace contained on a circuit board that is designed for optimal signal transmission.

The transmitter further includes a metallic isolation sleeve aligned with the radiating trace formed on the circuit board. In one embodiment of the invention, the isolation sleeve is mounted to the exterior surface of the transmitter post in general alignment with the transmission element contained within the transmitter post. The isolation sleeve functions to enhance the performance of the transmitter and reduce the signal attenuation caused by the meter pit. Specifically, the isolation sleeve enhances the performance of the transmitter when the transmitter is utilized with various different types of pit lid materials. The isolation sleeve provides impedance matching between the internal radiating trace on the printed circuit board and the radiating antenna. The use of the metallic isolation sleeve reduces the external influences of the pit lid, regardless of whether the pit lid is formed from plastic, composite or various different metals. The isolation sleeve provides the internal transmission element with the same tuning or impedance matching characteristics as a metallic pit lid. This function is extremely beneficial when the antenna is utilized with a non-metallic pit lid.

In addition, the isolation sleeve redirects the transmission element, and specifically the lower lobe of the PCB-mounted dipole antenna, and forces the energy toward the radiating plate of the radiating antenna. This feature is accomplished by the geometry, size and position of the isolation sleeve relative to both the transmission element and the antenna radiator. The position and geometry of the isolation sleeve provides the impedance matching necessary for improved communications.

In addition, the isolation sleeve reduces the amount of energy escaping from the transmission element into the meter pit, which otherwise causes undesired resonant frequencies in metal pits. Since there are many different types of pits, the isolation sleeve functions to isolate the resonance frequencies for all different types of meter pit configurations.

In addition to the transmitter, the communication device includes a self-contained antenna unit that, when coupled to the transmitter, transmits RF signals away from the communication device. The antenna unit and transmitter are designed to be interconnected during field installation of the communication device and are each self-contained units.

The antenna unit includes a base having an upper support portion and a depending attachment section. The upper support portion receives a radiating antenna, including a ground plate, a dielectric spacer and a radiator plate. The ground plate is mounted to the upper support portion of the base. The dielectric spacer is positioned above the ground plate and receives the radiator plate. The dielectric spacer separates the ground plate and radiator plate and holds the two components of the radiating antenna in a parallel relationship. The ground plate includes a shorting bar that provides a physical connection between the ground plate and the radiator plate.

The entire radiating antenna, including the ground plate, spacer and radiator plate, is enclosed by the interconnection between a top cap and the upper support portion. Preferably, the top cap is attached to the upper support portion and sealed thereto prior to installation of the communication device at a consumer site.

The depending base of the antenna unit includes external threads and is sized to extend through the conventional opening formed in the pit lid. Once the attachment section of the base is positioned within the opening in the pit lid, a retaining nut is tightened along the external threads to entrap the pit lid between the upper support portion and the retaining nut.

When the base of the antenna unit is installed onto the pit lid, the entire radiating antenna, including the ground plate, spacer and radiator plate are positioned above the top surface of the pit lid. The positioning of the entire radiating antenna above the pit lid reduces the effect the material of the pit lid has on the performance characteristics of the radiating antenna.

Once the antenna unit is mounted to the pit lid, the transmitter can then be attached to the antenna unit. Specifically, the transmitter post is aligned with the opening defined by the attachment section and the transmitter post is moved upward until the contact elements formed on the isolation sleeve engage a contact flange formed as part of the ground plate. The physical contact between the transmitter and the radiating antenna occurs above the top surface of the pit lid.

Once the transmitter post is fully inserted into the antenna unit, the transmitter housing is secured to the attachment section such that the transmitter is supported by the pit lid. When supported by the antenna unit, a portion of the transmitter post extends past the top surface of the pit lid. Thus, a portion of the transmitter extends out of the meter pit to further enhance the transmission characteristics of the communication device.

BRIEF DESCRIPTION OF THE DRAWINGS

The drawings illustrate the best mode present contemplated in carrying out the invention. In the drawings:

FIG. 5 is a perspective view of the transmitter housing with the isolation sleeve mounted thereon;

FIG. 6 is a partial section view showing the transmission element contained within the transmitter post of the transmitter housing;

DETAILED DESCRIPTION OF THE PREFERRED EMBODIMENT

Figure 1:
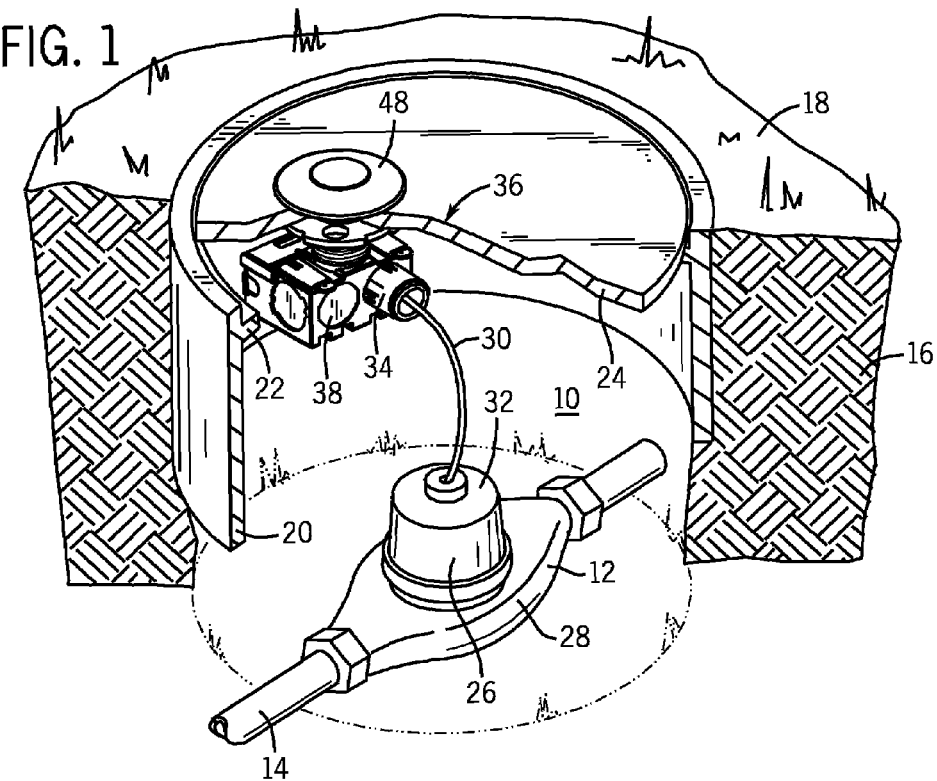
FIG. 1 is a partial sectional, perspective view of a utility meter including an electronic meter register coupled to a communication device and A pit lid antenna mounted beneath the pit lid.

Referring first to FIG. 1, thereshown is a meter pit 10 that includes a utility meter 12. In the embodiment of the invention illustrated, the utility meter 12 is water meter that is positioned in a water supply line 14 buried within the ground 16 and extending through the meter pit 10. Although the utility meter 12 will be described throughout the following description as being a water meter, it should be understood that the utility meter 12 could be any of a variety of different types of meters for measuring different types of consumable commodities, such as gas, water, electricity of other types of similar commodities.

As illustrated in FIG. 1, a meter pit 10 extends below the ground surface 18 and is defined by a pit box 20. The pit box 20 is a cylindrical, metal enclosure that is submerged into the ground 16. The pit box 20 includes an upper ledge 22 that supports a pit lid 24. In the embodiment of the invention illustrated, the pit lid 24 is preferably formed from a metallic material, such as cast iron. However, the pit lid 24 could be formed from various other materials, such as plastic or concrete. The pit lid 24 and pit box 20 enclose the meter pit 10.

The utility meter 12 includes a meter register 26 that is mounted to the meter body 28. Preferably, the meter register 26 is an electronic meter register that includes internal circuitry that monitors the rotational movement of components contained within the meter body 28. The electronic meter register 26 is a common commercial component that detects the rotational movement of components within the meter body 28 and generates an electronic count of the volume of commodity that flows through the meter 12. The electronic meter register 26 records the volumetric flow information received from the meter body 28 in a conventional manner. An example of an electronic meter register is the Sensus ICE® meter register.

As illustrated in FIG. 1, the electronic meter register 26 includes a data transfer wire 30 that extends through the top wall 32 of the meter register 26. The first end of the data transfer wire 30 is conductively connected at the manufacturing facility to the internal circuitry of the electronic meter register 26. The electronic meter register 26, including the data transfer wire 30, are conventional components and are currently in use in automatic meter reading units, such as the Sensus Radio Read® meter transceiver unit (MXU).

In the embodiment of the invention illustrated in FIG. 1, the second end of the data transfer wire 30 includes a connector module 34 that is received by communication device 36. The communication device 36 includes internal circuitry, which will be described in greater detail below, that receives data signals from the electronic meter register 26, including consumption data for the meter 12. The internal circuitry within the communication device 36 extracts the relevant consumption data and broadcasts a signal by radio frequency for reception and reading at a remote location. The communication device 36 includes both a radiating antenna and a transmission device that are each supported by the pit lid 24 and are electronically coupled to the electronic meter register 26 by the data transfer wire 30.

Figure 2:
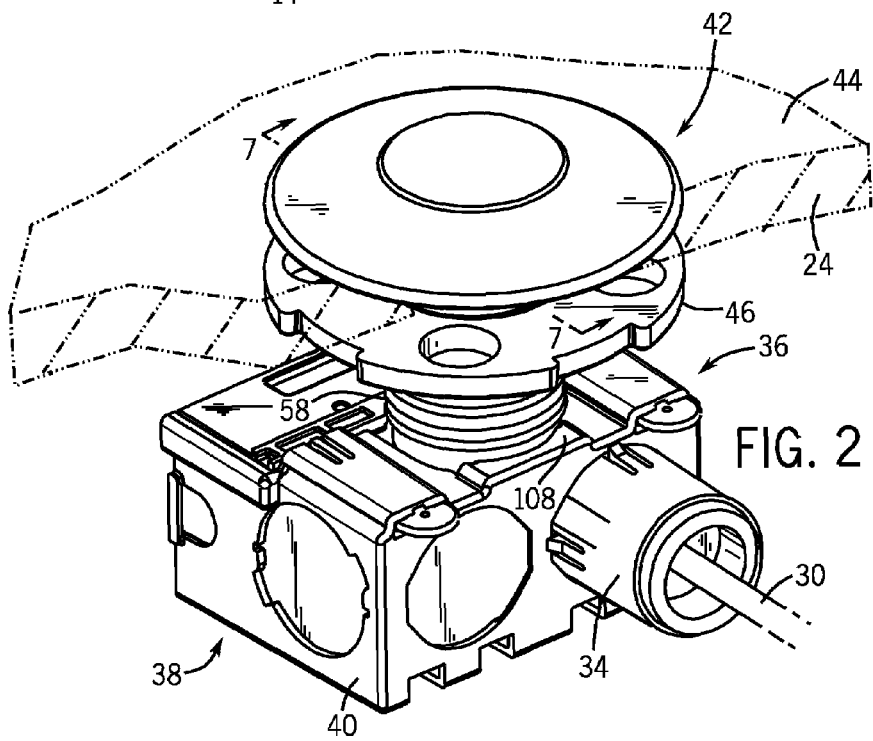
FIG. 2 is a perspective view illustrating the transmission device and pit lid antenna mounted beneath a pit lid.

As illustrated in FIG. 2, the communication device 36 is supported beneath the pit lid 24 and is coupled to the connector module 34 within the meter pit. The connector module 34 includes an inductive coil that relays meter information from the data transfer wire 30 to a corresponding inductive coil contained within the communication device 36. The inductive coupling between the communication device 36 and the connector module 34 is described in greater detail in corresponding U.S. patent application Ser. No. 11/089303, the disclosure of which is incorporated herein by reference.

As illustrated in FIG. 2, the communication device 36 includes a transmitter 38 supported by an antenna housing 42. The antenna housing 42 is supported along the top surface 44 of the pit lid 24 and is secured in place by a retaining nut 46. Thus, as can be understood in FIG. 2, the entire communication device 36, including the transmitter 38 and the antenna housing 42, is supported by the pit lid 24.

Figure 3:
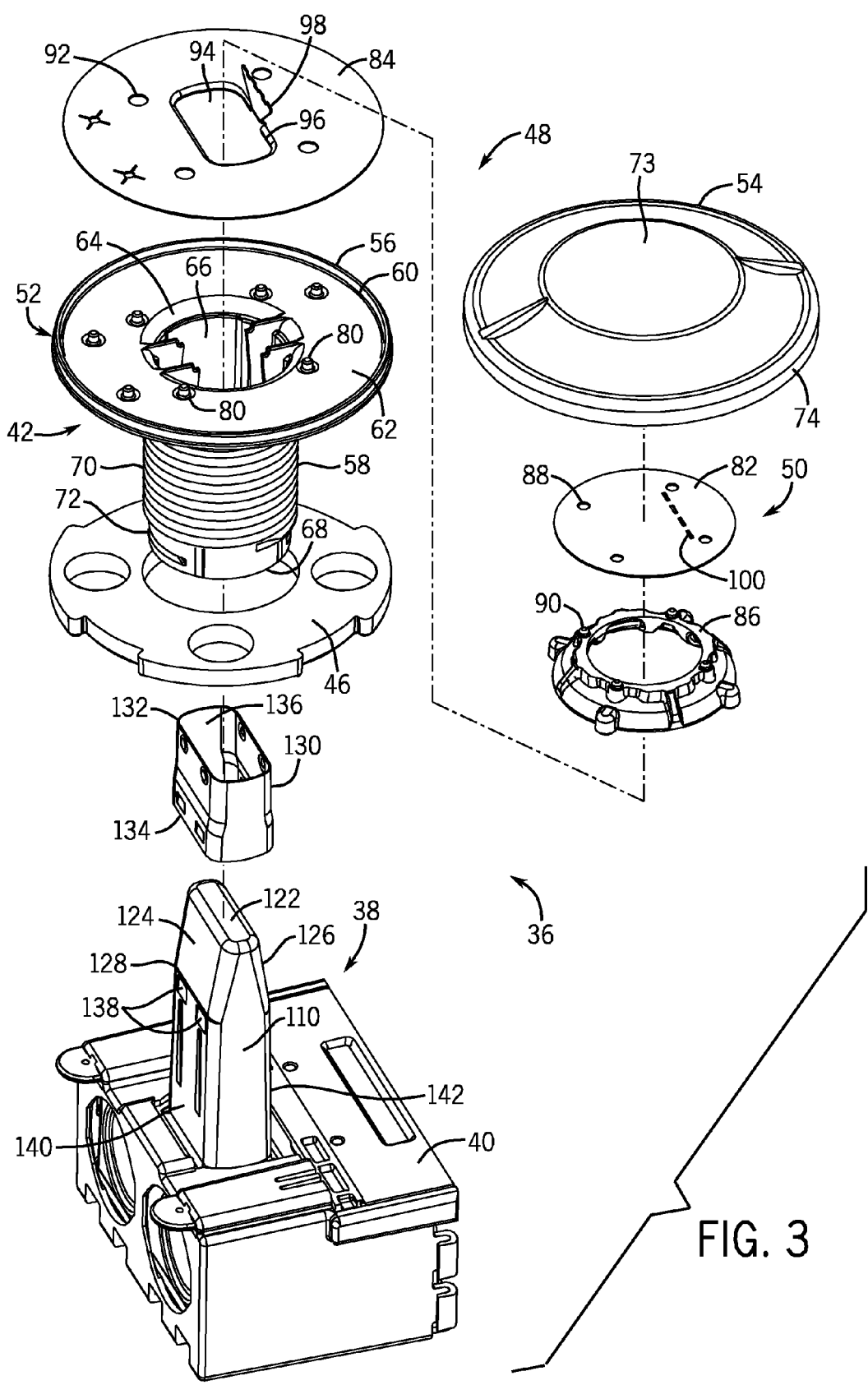
FIG. 3 is an exploded view of the transmission device and pit lid antenna.

Referring now to FIG. 3, thereshown is an exploded view of the communication device 36. As discussed, the communication device 36 includes the transmitter 38 and a self-contained antenna unit 48, where the transmitter 38 is mounted to the antenna unit 48 during usage.

The antenna unit 48 includes both an antenna housing 42 and a radiating antenna 50 that are combined prior to installation to form the self-contained antenna unit 48. The antenna housing 42 generally includes a base 52 and a top cap 54. The base 52 includes an upper support portion 56 and a depending attachment section 58. Preferably, the upper support portion 56 and the attachment section 58 are integrally formed with each other from a dielectric material, such as plastic.

The upper support portion 56 includes an outer rim 60 extending upward from a generally flat top wall 62. The top wall 62 includes a central opening 64 that communicates with the open interior 66 defined by the attachment section 58. The open interior 66 extends from the central opening 64 to the bottom end 68 of the attachment section 58.

The attachment section 58 includes a series of external threads 70 that extend almost the entire length of the attachment section. The bottom end 68 of the attachment section includes a pair of attachment grooves 72 that are received by a portion of the transmitter housing 40 to secure the transmitter housing 40 to the antenna housing 42.

Figure 7:
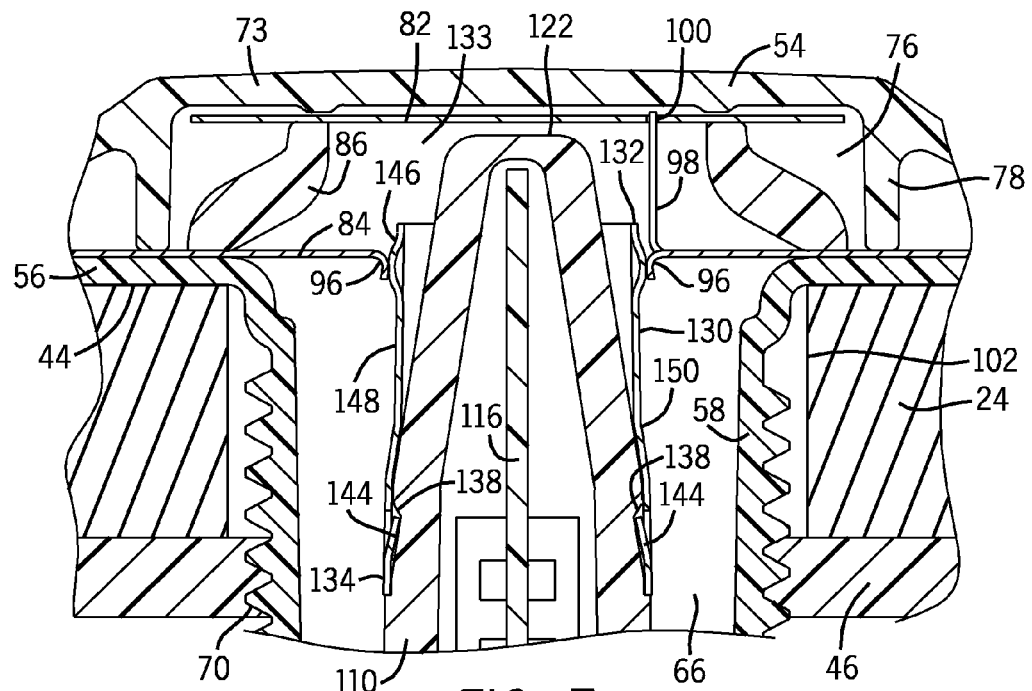
FIG. 7 is a partial section view taken along line 7-7 of FIG. 2 illustrating the interaction between the ground plate of the antenna and the isolation sleeve.

The top cap 54 has a generally circular shape having a top wall 73 and defined at its outer edge by an outer rim 74. The outer rim 74 of the top cap 54 is sized to engage the outer rim 60 of the base 52. When the top cap 54 is affixed to the upper support portion 56, the top cap and upper support portion 56 define an open cavity 76, as shown in FIG. 7. The open cavity 76 is defined by the top wall 73 and an inner support flange 78 formed as part of the top cap 54. Preferably, the top cap 54 is formed from molded plastic and can be secured to the upper support portion 56 by induction welding or any similar method of secure attachment.

Referring back to FIG. 3, the top wall 62 of the base 52 includes a series of spaced alignment pegs 80 that each extend from the top wall 62. The alignment pegs 80 are formed from the same dielectric material as used to form the base 52.

The radiating antenna 50 that forms part of the antenna unit 48 includes a radiator plate 82, a ground plate 84 and a dielectric spacer 86. The combination of the radiator plate 82, ground plate 84 and dielectric spacer 86 allows the antenna unit 48 to transmit RF signals from the transmitter 38 contained within the meter pit 10, as shown in FIG. 1.

The radiator plate 82 is a generally circular member formed from a metallic material, such as copper. In the embodiment of the invention shown, the radiator plate has a diameter of two inches. The radiator plate 82 includes a series of alignment holes 88 that each receive an alignment peg 90 formed as part of the spacer 86. As best illustrated in FIG. 7, the spacer 86 supports the radiator plate 82 and separates the radiator plate 82 from the ground plate 84. The spacer 86 ensures that the radiator plate 82 and ground plate 84 are maintained in a spaced, parallel relationship with each other.

The ground plate 84 is a generally circular member formed from a metallic material, such as copper. In the embodiment of the invention shown, the ground plate 84 has a diameter of 3.6 inches. The ground plate 84 includes a series of alignment holes 92 that each receive one of the alignment peg 80 formed on the top wall 62 of the upper support portion 56. The interaction between the alignment holes 92 and the alignment pegs 80 provides for the proper orientation of the ground plate 84 on the upper support portion 56.

The ground plate 84 includes a generally rectangular center opening 94 defined by a contact flange 96 extending below the otherwise planar ground plate 84. As can be understood in FIG. 3, the center opening 94 of the ground plate 84 is generally aligned with the opening 64 defined by the upper support portion 56 of the base 52.

The ground plate 84 includes a shorting bar 98 that extends upward from the ground plate 84. As illustrated in FIG. 7, the shorting bar 98 is received within slots 100 formed as part of the radiator plate 82. The shorting bar 98 extends through the center of the spacer 86 to provide a conductive connection between the ground plate 84 and the radiator plate 82. Thus, the ground plate 84 and the radiator plate 82 are conductively connected through the shorting bar 98. Preferably, the shorting bar 98 is integrally formed with the metallic material that forms the ground plate 84.

As illustrated in FIGS. 3 and 7, when the complete antenna unit 48 is assembled, the radiating antenna 50, including the ground plate 84, spacer 86 and radiator plate 82 are enclosed between the upper support portion 56 of the base 52 and the top cap 84. Thus, the radiating antenna 50 is environmentally protected by the combination of the base 52 and the top cap 54.

Referring now to FIG. 3, the top cap 54 has been designed to achieve high load bearing requirements. To accommodate vehicle loads and maintain a low profile, the top cap 54 of the antenna unit includes sloped, reinforced sides that extend upward to the top wall 73. The sloped sides are valuable for minimizing concentrated loads by allowing a vehicle tire to uniformly distribute its weight through the sloped sides and onto the pit lid. The slope of the top cap 54 compliments the curvature of a vehicle's tire when the vehicle traverses the antenna housing. Additionally, the sloping sides of the top cap 54 prevent water from collecting above the radiating element of the antenna.

Presently, wireless radios are added to utility meters everywhere and not only must the antenna perform well, but the antenna must also be safe for use in society. To minimize the risk of the pit antenna creating a hazardous environment, the top cap 54 has been designed with long, tapered edges that slope from the pit lid to the top wall 73. The highest point of the top cap 54 is not pointed, but merely flat, making a change in level similar to a threshold of a doorway.

As can be understood in FIGS. 2 and 7, when the antenna housing 42 is mounted to the pit lid 24, the depending attachment section 58 extends through opening 102 formed in the pit lid 24. Typically, the opening 102 has a diameter of approximately 1.75 inches. The upper support portion 56 has a diameter greater than the diameter of the opening 102 in the pit lid 24 such that the upper support portion 56 can support the antenna housing on the top surface 44 of the pit lid 24.

When the base 52 is positioned on the pit lid 24, the attachment section 58 extends through the opening 102 and the retaining nut 46 can be rotated along the external threads 70 to entrap the lid 24 between the upper support portion 56 and the retaining nut 46. If the antenna unit needs to be removed, the retaining nut 46 can be rotated in the opposite direction and removed entirely from the attachment section 58, thereby allowing the antenna unit to be removed.

Referring now to FIG. 5, the transmitter 38 includes a sealed inner enclosure 104 that is surrounded by an outer shell or boot 106. The outer shell 106 is a clam shell-like plastic component that includes a pair of projecting flanges 108 that are received in and engage the mounting slots 72 formed near the bottom end 68 of the attachment section 58, as shown in FIG. 3. The outer shell 106 is preferably formed from a plastic material that can be snapped onto the inner enclosure 104 as illustrated in FIG. 5.

As shown in FIG. 5, the inner enclosure 104 includes a transmitter post 110 that extends from the top surface 112 of the outer shell 106. Preferably, the transmitter post 110 and the inner enclosure 104 are integrally formed around the internal operating circuitry of the transmitter 38. Specifically, the transmitter circuitry is included within the main body portion 114 of the transmitter 38 and includes the required circuitry to receive digital data signals from the meter register and create RF signals for transmission to remote reading locations. The electronic circuitry is preferably powered by an internal power supply that provides the required power to operate the transmission circuitry.

As illustrated in FIG. 6, the internal circuitry within the transmitter 38 includes a circuit board 116 that extends upward into the transmitter post 110. The upper end of the circuit board 116 includes a transmission element 118. The transmission element 118 functions to radiate the signals generated by the transmitter circuitry such that the signals can be transmitted out of the meter pit. In the embodiment of the invention illustrated in FIG. 6, the transmission element 118 is an antenna trace 120 printed on the circuit board 116. The antenna trace 120 has a serpentine pattern in the embodiment of the invention illustrated. The specific configuration of the antenna trace 120 is described in U.S. Pat. No. 6,850,197, the subject matter of which is incorporated herein by reference.

As illustrated in FIG. 6, the circuit board 116 extends to the upper end 122 of the transmitter post 110. Thus, the antenna trace 120 is positioned near the upper end 122 of the transmitter post 110.

In the preferred embodiment of the invention, the inner enclosure 104 and the transmitter post 110 are formed from a high density polyethylene (HDPE) that is molded around the transmitter circuit including the circuit board 116.

Referring back to FIG. 3, the transmitter post 110 includes a tapered front wall 124 and a tapered back wall 126. Thus, the width of the transmitter post 110 increases from the upper end 122 to the transition point 128. The tapered front and back walls 124, 126 allow an isolation sleeve 130 to be mated onto the transmitter post 110. The isolation sleeve 130 is preferably formed from a metallic material, such as copper, and extends from a top end 132 to a bottom end 134. The size of the inner surface 136 of isolation sleeve 130 increases from the top end 132 to the bottom end 134 such that as a isolation sleeve 130 is mated onto the transmitter post 110, the inner surface 136 frictionally engages the transmitter post 110.

The transmitter post 110 includes a pair of retaining notches 138 formed on both the lower front wall 140 and the lower back wall 142. Each of the retaining notches 138 receives a locking tab 144 formed near the bottom end 134 of the isolation sleeve 130, as best shown in FIG. 7. As can be seen in FIG. 7, the locking tabs 144 are received within the retaining notches 138 to prevent the removal of the isolation sleeve 130 from the transmitter post 110.

Referring now to FIG. 5, the isolation sleeve 130 includes a pair of contact elements 146 protruding from both the front wall 148 and back wall 150 of the isolation sleeve 130. In the embodiment of the invention illustrated, each of the contact elements 146 are round, button-like protrusions formed as part of the isolation sleeve. As can best be seen in FIG. 7, each of the contact elements 146 protrudes from the otherwise smooth front and back walls 148, 150.

Referring now to FIG. 6, when the isolation sleeve 130 is attached to the transmission post 110, the isolation sleeve 130 is generally aligned with the antenna trace 120 contained on the circuit board 116. The metal isolation sleeve 130 functions in parallel with the antenna trace 120 and isolates radiation from occurring below the pit lid, minimizes the detuning of the transmitter from different pit materials and directs energy from within the meter pit to the radiating antenna.

In the embodiment of the invention illustrated in the Figures, the isolation sleeve performs various different functions to enhance the operation of the antenna unit. Specifically, the metallic isolation sleeve 130 is generally aligned with antenna trace 120 and provides impedance matching between the antenna trace 120 and the radiating elements of the radiating antenna. The antenna unit of the preferred embodiment can be utilized with pit lids formed from various materials, such as plastic, composite and various different types of metals. The use of the metallic isolation sleeve 130 reduces the external influence of the pit lid such that the antenna unit functions in a similar manner regardless of the type of material used to form the pit lid. Essentially, the isolation sleeve 130 provides the antenna trace 120 with the same tuning or impedance matching characteristics as if the antenna trace were used within a pit having a metallic pit lid. This function is extremely beneficial when the antenna is utilized in a pit having a pit lid formed from a material other than metal. If the isolation sleeve 130 were not present, installations that do not utilize a metallic pit lid would become poorly matched, resulting in a reduction of radiated power and effective range.

In addition, the isolation sleeve 130 redirects the printed circuit board dipole antenna trace 120, and specifically the lower lobe of the antenna trace, and forces the energy from the antenna trace toward the radiating plate of the radiating antenna. The physical geometry of the isolation sleeve 130, the position of the isolation sleeve relative to the antenna trace and the radiating plate, as well as the size of the isolation sleeve, affect the redirection of the radiated energy.

Further, the isolation sleeve 130 reduces the amount of energy escaping from the antenna trace into the meter pit. The escaping energy into the meter pit causes undesired resonant frequencies in metal pits. Since the antenna unit can be utilized with many different types of pits, the isolation sleeve functions to isolate the resonant frequencies regardless of the material used to form the meter pit.

Figure 4:
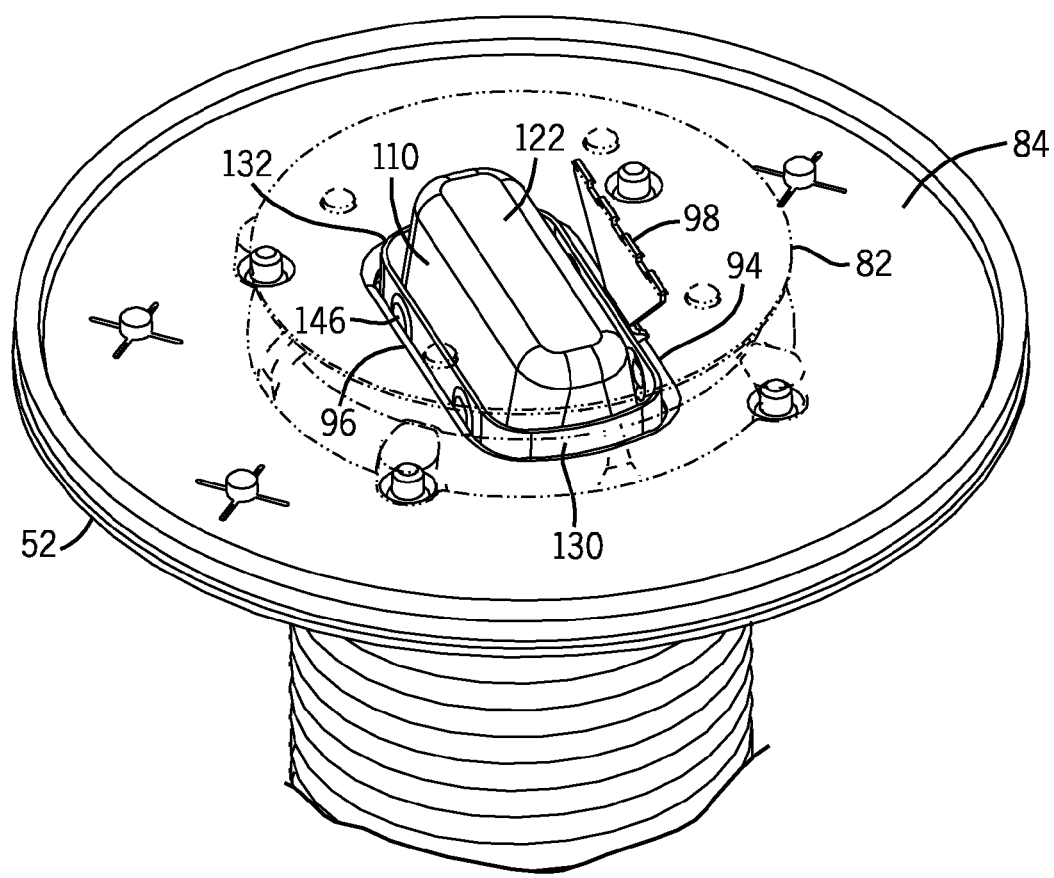
FIG. 4 is a partial perspective view of the antenna housing and the transmitter post of the transmitter housing.

Referring now to FIG. 4, thereshown is the position of the transmitter post 110 within the base 52 of the antenna housing when the transmitter is supported beneath the pit lid by the antenna unit. As described previously, the antenna unit, including the base 52, is initially installed on the pit lid, as best shown in FIGS. 2 and 7. Once the base has been secured by the retaining nut 46, the transmitter post 110 is inserted into the open interior 66 defined by the attachment section 58 of the base 52. The transmitter housing 40 is moved upward until the flanges 108 engage the respective mounting slots 72 formed in the attachment section 58, as best shown in FIG. 2. When the transmitter housing 40 is secured to the antenna housing 42, the upper end 122 of the transmitter post 110 and the top end 132 of the isolation sleeve 130 extend through the center opening 94 of the ground plate 85, as shown in FIG. 4. As illustrated in FIG. 7, the top end 122 of the transmitter post 110 is positioned slightly below the radiator plate 82 and within the center cavity 133 defined by the spacer 86.

As shown in FIG. 4, when the transmitter housing is attached to the antenna housing, the contact elements 146 of the isolation sleeve 130 physically engage the contact flange 96 formed as part of the ground plate 84. Thus, the isolation sleeve 130 of the transmitter is mechanically and conductively connected to the ground plate 84 of the radiating antenna by the contact elements 146 and the contact flange 96. The physical and mechanical interconnection between the transmitter and the radiating antenna enhances the signal transfer from the transmission element contained on the circuit board 116 and the radiating antenna, including the parallel, spaced ground plate 84 and radiator plate 82. Without the mechanical interconnection between the isolation sleeve 130 and the ground plate 84, a significant amount of the signal strength is lost and thus not radiated by the radiating antenna, including the ground plate 84 and radiator plate 82.

Figure 8:
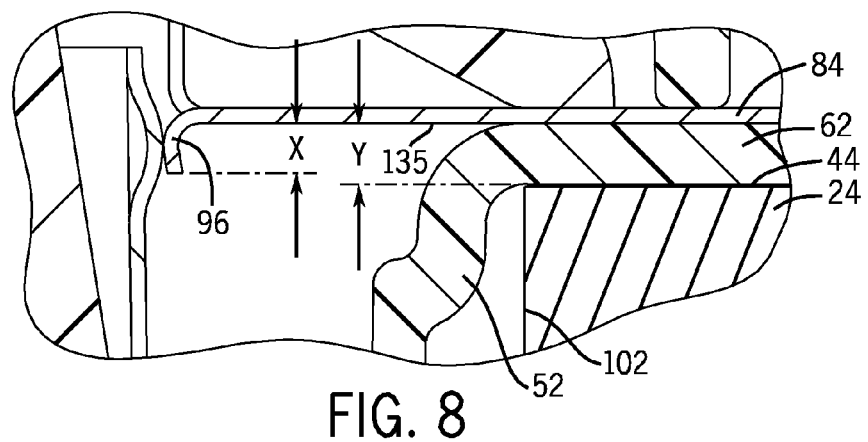
FIG. 8 is a magnified view illustrating the interaction between the ground plate and the isolation sleeve at a location above the pit lid.

Referring now to FIG. 8, the entire radiating antenna, including the entire ground plate 84, is positioned above the pit lid 24 to enhance the radiating characteristics of the radiating antenna. As illustrated in FIG. 8, the ground plate 84 is spaced above the top surface 44 of the pit lid 24 by the thickness of the top wall 62 of the base 52. The thickness of the top wall 62 is illustrated by reference character "Y" in FIG. 8. In the embodiment of the invention illustrated, the thickness of the top wall 62 is approximately 0.080".

As described previously, the ground plate 84 includes a depending contact flange 96 that protrudes below the lower surface 135 of the ground plate 84. In the embodiment of the invention illustrated in FIG. 8, the contact flange 96 protrudes a distance represented by reference character "X". The distance X that the contact flange 96 extends below the lower surface 135 is nothing less than the thickness Y of the top wall 62. In the embodiment of the invention illustrated, the distance X is approximately 0.065". Thus, every portion of the ground plate 84 is positioned above the top surface 44 of the pit lid 24. The rest of the radiating antenna is positioned above the ground plate 84 and is above the pit lid 24. As illustrated, no portion of the radiating antenna extends into the opening 102. Positioning of the entire radiating antenna above the pit lid enhances the transmission characteristics of the radiating antenna and reduces the effect the material used to form the pit lid 24 has on the radiating characteristics of the antenna.

As can be understood in FIG. 7, the upper end 122 of the transmitter post 110 extends past the top surface 44 of the pit lid 24. In addition, a portion of the circuit board 116 that includes the transmission element also extends past the top surface 44 of the pit lid 24. Further, the top end 132 of the isolation sleeve 130 also extends past the top surface 44 of the pit lid 24 such that the contact elements 46 engage the depending contact flange 96 above the top surface of the pit lid 24. As discussed previously, the RF signals to be transmitted away from the meter pit are radiated from the transmission element 118 contained on the circuit board 116 (FIG. 6). Since the transmission element 118 is generally aligned with the isolation sleeve 130, which is in physical contact with the ground plate 84, the isolation sleeve 130 aids in the transference of the RF signal from the transmitter to the radiating antenna. As discussed, the combination of the ground plate 84 and radiator plate 82 transmit the RF signals away from the meter pit for reception at a remote location.

As can be understood by the above description, the transmitter 38 and the antenna unit 48 can each be assembled as separate complete units prior to field installation. Once a trained technician arrives in the field, the technician can initially install the antenna unit 48 by placing the base 52 through the opening 102 in the pit lid 24 and securing the base 52 relative to the pit lid by using the retaining nut 46. Once the base is retained, the transmitter is attached to the antenna unit by inserting the transmitter post 110 into the open interior defined by the base.

Once the transmitter post 110 is fully inserted, the transmitter housing 40 is secured to the attachment section 58 of the base 52. As best shown in FIG. 4, when the transmitter is secured to the antenna unit, the contact elements 146 physically contact the contact flange 96 of the ground plate 84 to enhance the signal transfer from the transmission element to the radiating antenna. Since the entire radiating antenna, including the ground plate 84, radiator plate 82 and dielectric spacer 86 are positioned entirely above the pit lid, the attenuation caused by the pit lid is greatly reduced. Further, the configuration of the contact elements 46 and the contact flange 96 ensures a proper connection between the radiating antenna and the transmitter 38.

After the initial installation, if the transmitter 38 and the antenna unit 48 need to be removed and replaced, the above steps can be reversed to remove the transmitter and antenna unit for repair or replacement. To begin removal, the transmitter housing 40 is detached from the base 52. Once the transmitter housing 40 is removed, the retaining nut 40 can be unthreaded from the base 52 such that the base 52 can be simply removed from within the opening formed in the pit lid. As can be understood, no separate mechanical connections need to be made during the installation of the pit lid antenna, other than the physical contact that occurs between the transmitter and the radiating antenna during the installation process.

Various alternatives and embodiments are contemplated as being within the scope of the following claims particularly pointing out and distinctly claiming the subject matter regarded as the invention.

What is claimed is:

1. A device for transmitting utility meter data from an underground meter pit including a utility meter and having a pit lid including an opening therethrough, the device comprising:
    an antenna housing comprising a top cap and a base having an upper support portion supported by the pit lid;
    a radiating antenna mounted within the antenna housing, the radiating antenna including a ground plate and a radiator plate spaced from the ground plate;
    a transmitter housing supported beneath the pit lid, the transmitter housing including an extending transmitter post at least partially received within the antenna housing;
    a transmitter circuit enclosed within the transmitter housing, the transmitter circuit including an antenna element positioned within the transmitter post; and
    a metallic isolation sleeve circumferentially surrounding with the antenna element.

2. The device of claim 1 wherein the entire radiating antenna is positioned above the pit lid.

3. The device of claim 1 wherein the transmission element is a radiating trace printed on a circuit board, wherein the radiating trace is generally aligned with the isolation sleeve.

4. The device of claim 1 wherein the metallic isolation sleeve is received along an outer surface of the transmitter post.

5. The device of claim 4 wherein the isolation sleeve mechanically contacts the radiating antenna when the transmitter post is at least partially received within the antenna housing.

6. The device of claim 5 wherein the isolation sleeve mechanically contacts the radiating antenna above the pit lid.

7. The device of claim 6 wherein the ground plate of the radiating antenna includes a depending contact flange configured to mechanically contact the isolation sleeve.

8. A device for transmitting utility meter data from an underground meter pit including a utility meter and having a pit lid including an opening therethrough, the device comprising:
    an antenna housing extending through the opening in the pit lid, the antenna housing including a base having an upper support portion in contact with the pit lid and a dependent attachment section extending through the pit lid and into the meter pit;
    a radiating antenna mounted within the antenna housing and positioned entirely above the pit lid, the antenna including a ground plate supported on the upper support portion of the antenna housing and a radiator plate;
    a transmitter housing supported within the meter pit, the transmitter housing including a transmitter post at least partially received within the attachment section of the antenna housing when the transmitter housing is supported within the meter pit;
    a transmitter circuit enclosed within the transmitter housing, the transmitter circuit including an antenna element positioned within the transmitter post; and
    a metallic isolation sleeve circumferentially surrounding with the antenna element of the transmitter circuit,
    wherein the isolation sleeve mechanically contacts the radiating antenna when the transmitter post is received within the attachment section of the antenna housing.

9. The device of claim 8 wherein the transmitter circuit includes a circuit board extending into the transmitter post, the circuit board including the transmission element.

10. The device of claim 9 wherein the transmission element is a radiating trace printed on the circuit board.

11. The device of claim 8 wherein the metallic isolation sleeve includes at least one contact element protruding from the isolation sleeve, wherein the contact element mechanically engages the contact flange of the ground plate.

12. The device of claim 8 wherein the ground plate of the radiating antenna engages the isolation sleeve at a location above the pit lid.

13. The device of claim 12 wherein the ground plate is a ring-shaped member having a center opening, wherein the transmitter post extends through the central opening of the ground plate.

14. The device of claim 13 wherein the ground plate includes a contact flange extending from the ground plate along the center opening, the contact flange being configured to mechanically engage the isolation sleeve.

15. The device of claim 14 wherein the metallic isolation sleeve includes at least one contact element protruding from the isolation sleeve, wherein the contact element mechanically engages the contact flange of the ground plate.

16. The device of claim 8 wherein the isolation sleeve is removably mounted to the transmitter post by a series of locking tabs.

17. The device of claim 8 wherein the ground plate includes an integral shorting bar configured to contact the radiator plate.

18. The device of claim 8 wherein the ground plate and the radiator plate are entrapped between the upper support portion and 1 top cap of the antenna housing.

19. The device of claim 8 wherein the isolation sleeve extends from a first end to a second end, wherein the isolation sleeve is tapered from the first end to the second end such that the isolation sleeve can be slid onto the transmitter post.

20. The device of claim 8 wherein the isolation sleeve is spaced from the transmission element and is not in mechanical contact with the transmission element when the isolation sleeve is received along the transmitter post.

21. The method of removably installing a pit lid antenna configured to transmit utility meter data from a utility meter contained within an underground meter pit including a pit lid having an opening therethrough, the method comprising:
    providing an antenna housing having a base having an upper support portion and a depending attachment section;
    positioning a radiating antenna within the antenna housing, the radiating antenna including a ground plate supported on the upper support portion of the antenna housing and a radiator plate;
    positioning the antenna housing on the pit lid where the upper support portion contacts a top surface of the pit lid and the attachment section extends through the opening and into the meter pit, wherein the entire radiating antenna is positioned above the pit lid and out of the meter pit;
    fitting a retainer nut around the attachment section of the antenna housing to capture the pit lid between the retainer nut and the upper support portion of the antenna housing;
    providing a transmitter housing that encloses a transmitter circuit, the transmitter housing having a transmitter post enclosing an antenna element;

positioning an isolation sleeve along an exterior surface of the transmitter post, the isolation sleeve being circumferentially surrounding the antenna element of the transmitter circuit; and positioning the transmitter post within the attachment section of the antenna housing such that the isolation sleeve mechanically contacts the radiating antenna.

22. The method of claim 21 further comprising the step of removably attaching the transmitter housing to the antenna housing such that the transmitter housing is supported within the meter pit below the pit lid by the antenna housing.

23. The method of claim 21 wherein the isolation sleeve mechanically contacts the ground plate of the radiating antenna at a location above the pit lid and outside of the meter pit.

24. The method of claim 23 further comprising the step of inductively coupling the transmitter housing to the utility meter such that the transmitter circuit receives meter data from the utility meter through the inductive connection.

25. The method of claim 21 wherein the isolation sleeve is slid onto the transmitter post and engages the transmitter post such that the isolation sleeve is spaced from and not in mechanical contact with the transmission element contained within the transmitter post.

26. The method of claim 22 wherein the transmitter post extends through the ground plate when the transmitter housing is attached to the antenna housing.

27. The method of claim 21 further comprising the step of positioning a circuit board of the transmission circuit within the transmitter post, the circuit board including the transmission element printed thereon.

* * * * *